Jan. 24, 1956 F. L. LE BUS, SR 2,732,150
BALANCED CABLE SPOOLING
Filed June 25, 1953 4 Sheets-Sheet 1

INVENTOR.
F. L. LeBus, Sr.
BY
ATTORNEY

Jan. 24, 1956  F. L. LE BUS, SR  2,732,150
BALANCED CABLE SPOOLING
Filed June 25, 1953  4 Sheets-Sheet 2

INVENTOR.
F. L. LeBus, Sr.
BY
ATTORNEY

United States Patent Office 2,732,150
Patented Jan. 24, 1956

2,732,150

BALANCED CABLE SPOOLING

Franklin L. Le Bus, Sr., Longview, Tex.

Application June 25, 1953, Serial No. 364,071

5 Claims. (Cl. 242—117)

This invention relates to improvements in cable winding devices.

As it is well known in the art, some sort of control must be maintained over the manner in which cables and the like are wound upon drums or spools, particularly when the cable is frequently extended, and under tension. Various noteworthy advances have been made in the art. However, in the prior art of controlled spooling, the cable is wound with only one control zone being used for progressing the cable along a drum, or with several indiscriminately placed control means. When cable is wound in this manner, the cable is not a uniform distance from the center of rotation of the drum or spool, resulting in a dynamically unbalanced structure which will vibrate when rotated, particularly at high speeds.

In one of the prior methods of cable spooling, the cable is wound on a drum in a combination helical and parallel path. The majority of the cable is wound parallel to the brake flanges of the drum whereby the cable in each successive layer will lay in grooves provided by the previous layer. To provide a progression of the cable across the drum core, a portion of each wind is wound at an angle to the brake flanges. The angled or helical portions of each wind are disposed in the same area; therefore, in this one area, the cable in each successive layer will not lay in grooves provided by the previous layer, but will be disposed completely outside of the previous layer. Taking the second layer as an example, it will be apparent that the parallel portion of each wind will be closer to the center of the drum core (the center of rotation) than the helical portion where the cable is disposed completely over the top of the first layer. Obviously, the moment of the cable at the helical area is greater than at the parallel area. Therefore, when the drum is rotated at high speeds, unequal centrifugal forces will be imposed on the drum to cause vibration.

The present invention contemplates counterbalancing of high spots on a drum core caused by the cross-over lap of cable between layers that tend to cause undue vibration at high speeds. Structurally, the drum core is provided with a plurality of sets of cable receiving grooves on the outer periphery thereof and disposed in a direction substantially parallel with the side faces of the drum flanges. The distance between the ends of each set of grooves is of a length less than half the circumference of the core, and the ends are in longitudinal alignment to provide a pair of smooth portions or gaps between at each end of each set of grooves. The pair of gaps are disposed substantially diametrically opposite each other on the core, and provide two control zones for assisting a bending of the cable winds in a slightly curved path from the parallel arrangement in order to progressively cross-over the first wind of a super-imposed layer of cable. In addition, the control zones assure that the cable cross-over operation is always in the same uniform plane. In this manner any high spots on the drum due to a partial cable cross-over action in one zone is counter- balanced by a diametrically opposite disposed zone completing the cross-over action and effecting a dynamic balance of the rotating drum core during the winding of a plurality of layers of cable thereon.

An important object of this invention is to eliminate vibration in a cable winding apparatus, and particularly a cable winding apparatus operation at high speeds.

Another object of this invention is to provide a cable winding apparatus for high speed spooling that substantially eliminates objectional vibration, by providing two cross-over control areas, whereby cable wound thereon will be dynamically balanced.

Another object of this invention is to minimize the chafing of a cable being wound on a cable winding apparatus, and further to minimize spool vibration due to a high spot in the wound cable, by counter-balancing to provide concentric rotation of the spool.

A further object of this invention is to provide means for bending a cable a distance at least equal to the diameter thereof in two separate and distinct steps during the first wind of the cable on a drum, thereby preventing scrubbing of the cable.

Another object of this invention is to positively control the reversing movement of a cable being wound on a drum to assure a proper cross-over of the cable wraps in a uniform plane.

A further object of this invention is to increase the service life of cable being wound on a drum or spool.

A still further object of this invention is to provide a cable winding apparatus which may be economically manufactured and requiring the minimum of maintenance.

Other objects and advantages of the invention will be evident from the following detailed description, read in conjunction with the accompanying drawings, which illustrate my invention.

Figure 1:
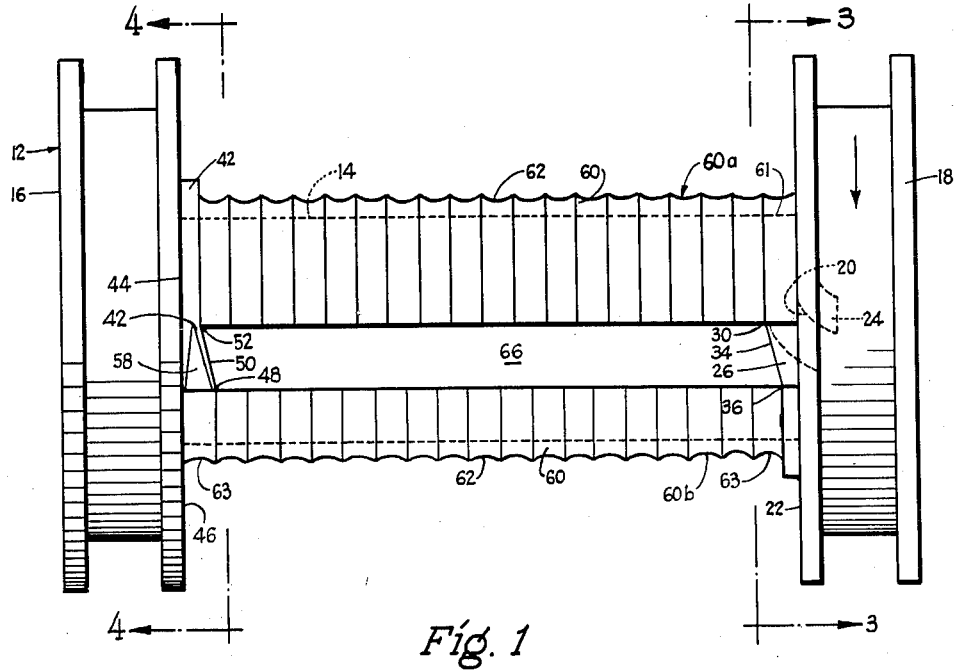
Figure 1 is a side elevational view of a novel cable winding apparatus.
Figure 2:
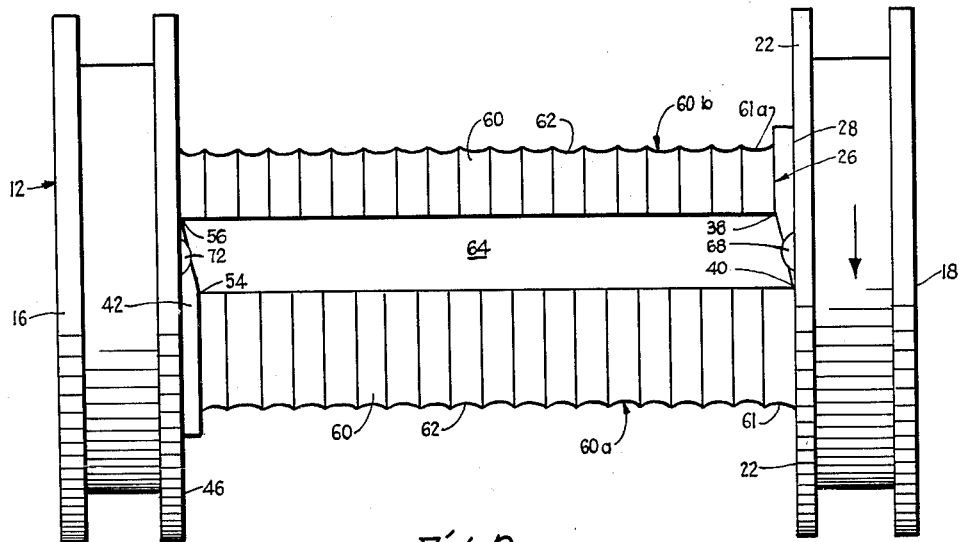
Figure 2 is another side elevational view of the cable winding apparatus shown in Fig. 1 turned around, and disclosing the opposite side of the apparatus.

Referring to the drawings in detail, and particularly Figs. 1 and 2, reference character 12 generally indicates a hoisting drum having a cylindrical core 14 with concentric brake flanges 16 and 18 on the opposite ends thereof. An aperture 20, as shown more clearly in Fig. 1, is provided in the inner wall 22 of the brake flange 18 outwardly of, but adjacent to, the drum core 14 to receive the dead end of a cable (not shown) as will be more fully hereinafter set forth. Also, a chock or block 24 is secured to the inner periphery of the brake flange 18 adjacent to the aperture 20 to assist in securing said cable.

Figure 5:
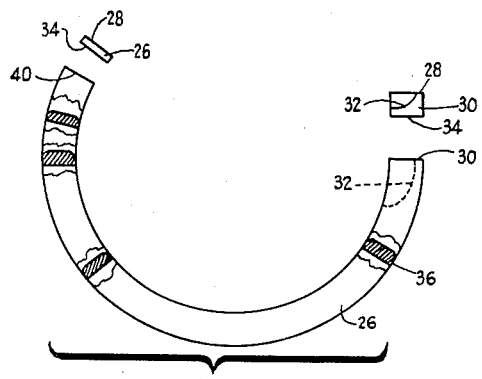
Figure 5 is a side elevational and both end views of the starting angle control bar with portions of the bar cut away and shown in section for clarity.

A starting angle control bar 26 (shown in detail in Fig. 5) is secured to the outer periphery of the drum core 14 in contact with the inner wall 22 of the brake flange 18. Longitudinally, the bar 26 is arcuately shaped to conform to the transverse contour of the drum core 14, and is of a length to extend around approximately sixty-five percent of the circumference of the core 14. The outer face 28 of the bar 26 is flat to conform to the adjacent face of the brake flange inner wall 22. One end 30 (the larger end) of the bar 26 is positioned approximately half way over the aperture 20. The bar 26 extends from this point clockwise around the core 14 as viewed from the inner face of the brake flange 18. A diminishing groove 32 is provided in the outer face 28 of the bar 26 extending from the end 30 to provide access to the aperture 20 as will be more fully hereinafter set forth.

The width of the bar 26 at the end 30 is substantially equal to the diameter of the cable to be wound on the drum 12. From the end 30, the inner face 34 of the bar 26 is tapered outwardly over approximately one-fifth the length of the bar 26 to a point 36 to such an extent that the width of the bar 26 at 36 is substantially equal to one-half the diameter of the cable to be wound on the drum 12. The bar 26 remains this same width through approximately three-fifths more of the length thereof to a point 38 (Fig. 3), whereupon the inner face 34 is again tapered outwardly until the other end 40 is formed substantially in a point. Both tapered portions of the inner face 34 are as gradual as possible under the space limitations.

The radial thickness of the bar 26 is uniform throughout the length of the bar and is substantially equal to the diameter of the cable to be wound on the drum 12. The bar 26 may be secured to the drum core 14 and brake flange inner wall 22 in any suitable manner, such as by welding.

Figure 6:
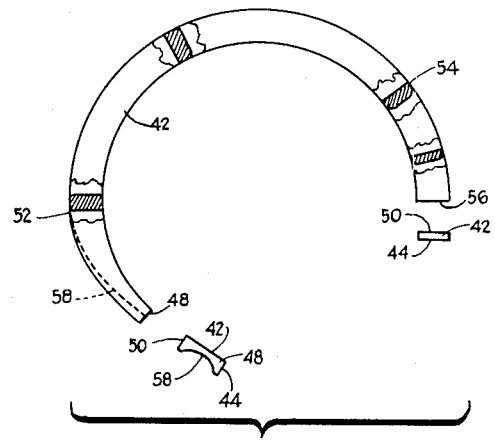
Figure 6 is a side elevational and both end views of the riser angle control bar with portions of the bar cut away and shown in section for clarity.

A second control bar 42, identified as the riser angle control bar, is secured on the opposite end of the drum core 14 in contact with the brake flange 16. Longitudinally, the bar 42 is also arcuately shaped (see Fig. 6) to conform to the transverse contour of the drum core 14 and is of a length to extend around approximately sixty-five percent of the circumference of the core 14. The outer face 44 of the bar 42 is flat to conform to the inner face 46 of the brake flange 16. One end 48 of the bar 42 is in alignment with the point 36 on the opposite control bar 26. From the end 48, the bar 42 extends clockwise around the core 14 as viewed from the brake flange 18. The width of the bar 42 at the end 48 is substantially equal to the diameter of the cable to be wound on the drum 12.

The inner face 50 of the bar 42 is tapered outwardly from the end 48 over approximately one-fifth the length of the bar to a point 52. At the point 52, the width of the bar 42 is substantially equal to one-half the diameter of the cable to be wound on the drum 12. From the point 52 over approximately three-fifths more of the length of the bar 42, and to a point 54, the width of the bar remains uniform. The inner face 50 of the bar 42 is again tapered outwardly from the point 54 to the other end 56 to such an extent that the end 56 is brought substantially to a point.

Figure 4:
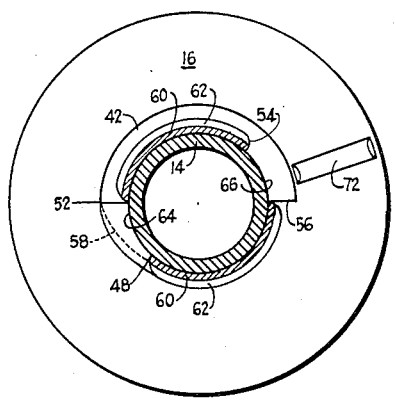
Figure 4 is another sectional view taken along lines 4—4 of Fig. 1.

Throughout the major portion of the bar 42, the radial thickness thereof is uniform and is slightly greater than the diameter of the cable to be wound on the drum 12. However, from the point 52 to the end 48, the outer periphery of the bar 42 is tapered inwardly and is provided with a diminishing groove 58 therein (Fig. 4). The groove 58 is largest at the end 48 and diminishes both in depth and width toward the point 52, where it terminates.

The bars 26 and 42 are of substantially the same length and are arranged on the drum core 14 in a predetermined relationship. The large end 30 of the bar 26 is in line (longitudinally of the core 14) with the point 52 on the bar 42, and the large end 48 of the bar 42 is in line with the point 36 on the bar 26. Between these two points, the inner faces 34 and 50 extend in the same direction. Also, the small end 40 of the bar 26 is in line with the point 54 on the bar 42, and the small end 56 of the bar 42 is in line with the point 38 on the bar 26. And, the inner faces 34 and 50 extend in the same direction between these two last mentioned points.

A plurality of bars 60, having longitudinal grooves 62 in the outer periphery thereof, are secured on the outer surface of the drum core 14. Each bar 60 is arcuately shaped longitudinally to conform to the transverse contour of the drum core 14, and is of a length to extend around approximately thirty-five percent (but not limited thereto) of the circumference of the core 14. As clearly shown in Figs. 1 and 2, the bars 60 are arranged in two sets on the core 14 with the bars in each set side by side and aligned along the core 14. In one set (the upper set 60$^a$ as shown in Figs. 1 and 2), the bar 61 nearest the brake flange 18 is in contact with the inner face 22 of the brake flange 18 and extends between the opposite ends of the starting control bar 26. The remainder of the bars 60 in this upper set are in alignment along the core 14 and completely cover the outer surface of the core 14 between the brake flange 18 and the riser control bar 42. In set 60$^b$, the bar 63 closest to control bar 26 is offset one half the diameter of the cable or the width of the bar 26 at this point, and the remainder of the bars 60, i. e., in the lower set 60$^b$, are disposed on the core diametrically opposite the first mentioned group or set and extend from the bar 26 to the inner face 46 of the flange 16.

It will thus be seen that the two sets of bars 60$^a$ and 60$^b$ are offset longitudinally of the core 14 a distance equal to approximately one-half the diameter of a cable to be wound on the drum 12. This arrangement provides for a progression of the cable across the drum as it is being wound thereon as will be more fully hereinafter set forth. Each groove 62 is of a width substantially equal to the diameter of the cable being wound to efficiently guide the cable onto the drum 12.

Figure 3:
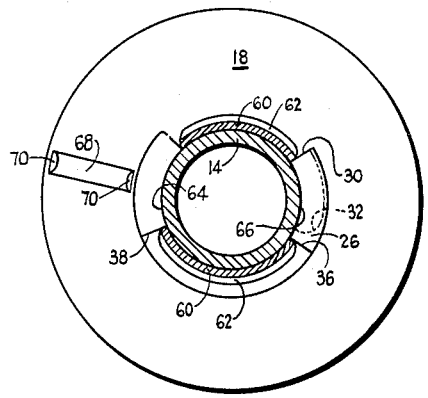
Figure 3 is a sectional view taken along lines 3—3 of Fig. 1.

It will also be apparent that the above arrangement of the bars 60 provides two diametrically opposed smooth surfaces amounting to open or cut away portions 64 and 66 on the core 14 extending in a uniform plane transversely between the tapered portions of the control bars 26 and 42. Each of the smooth surfaces 64 and 66 extends over approximately fifteen percent of the circumference of the core 14. The object of the surfaces 64 and 66 is to permit a slight bending of a cable thereon during the application of the first layer of cable on the drum 12 as will be more fully hereinafter set forth. Hence, the gaps or grooves designated by the surfaces 64 and 66, and the space covered by the radial projection of these surfaces, are sometimes hereinafter referred to as the second and first control zones, respectively. As shown in Figs. 3 and 4, the opposite ends of the bars 60 are somewhat rounded off to minimize chafing of a cable contacting the ends thereof during a winding operation.

Although I have described the bar grooves 62 as being provided by securing grooved bars 60 on the outer periphery of the drum core 14, I do not wish to be limited to such specific construction. The grooves 62 may be formed in various other ways, such as by machining or casting the grooves directly into the outer surface of the core 14, for example.

Figures 7, 8:
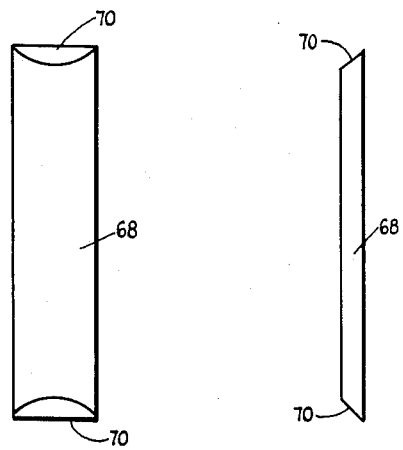
Figure 7 is a front elevational view of a typical control strip.
Figure 8 is a side elevational view of the control strip shown in Fig. 7.
Figure 9:
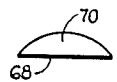
Figure 9 is an end view of the control strip shown in Figs. 7 and 8.

A control strip, or cross over bar 68 (Figs. 2 and 3) is secured to the inner surface 22 of the brake flange 18 radially with respect to the core 14 and in line with a center point of the control zone 64 (Figs. 2 and 3). The strip 68 extends from the outer periphery of the control bar 26 to substantially the outer edge of the brake flange 18. As shown in Figs. 7, 8 and 9, the opposite ends 70 of the strip 68 are chamfered, and the exposed surface of the strip is rounded transversely of the strip. Thus, a cable coming in contact therewith will not be chafed. The thickness of the strip 68 is substantially equal to one-fourth the diameter of a cable being wound on the drum 12. An identical control strip 72 is secured to the inner face 46 of the brake flange 16 directly in line with the strip 68 as clearly shown in Figs. 2 and 4.

*Operation*

To place the drum 12 in operation, one end (not shown) of a cable is threaded through the groove 32 of the control bar 26 and the drum aperture 20, and is secured by a clamp or the like (not shown) to the chock 24. The cable is then extended in a direction transverse to the center line of the drum 12, held under tension, and the drum 12 is rotated counter-clockwise as viewed from the outer face of the brake flange 18 of Fig. 1. The cable is thus wound onto the drum 12 in one or more layers, depending upon the amount desired. However, in the following description, the cable in the various layers will have different reference characters. That is, the cable comprising the first layer will be noted with reference character 74, the second layer 76, and the third layer 78 to facilitate explanation of the operation in connection with the schematic drawing, Fig. 10. It being understood a single cable is actually wound on the drum 12.

Figure 10:
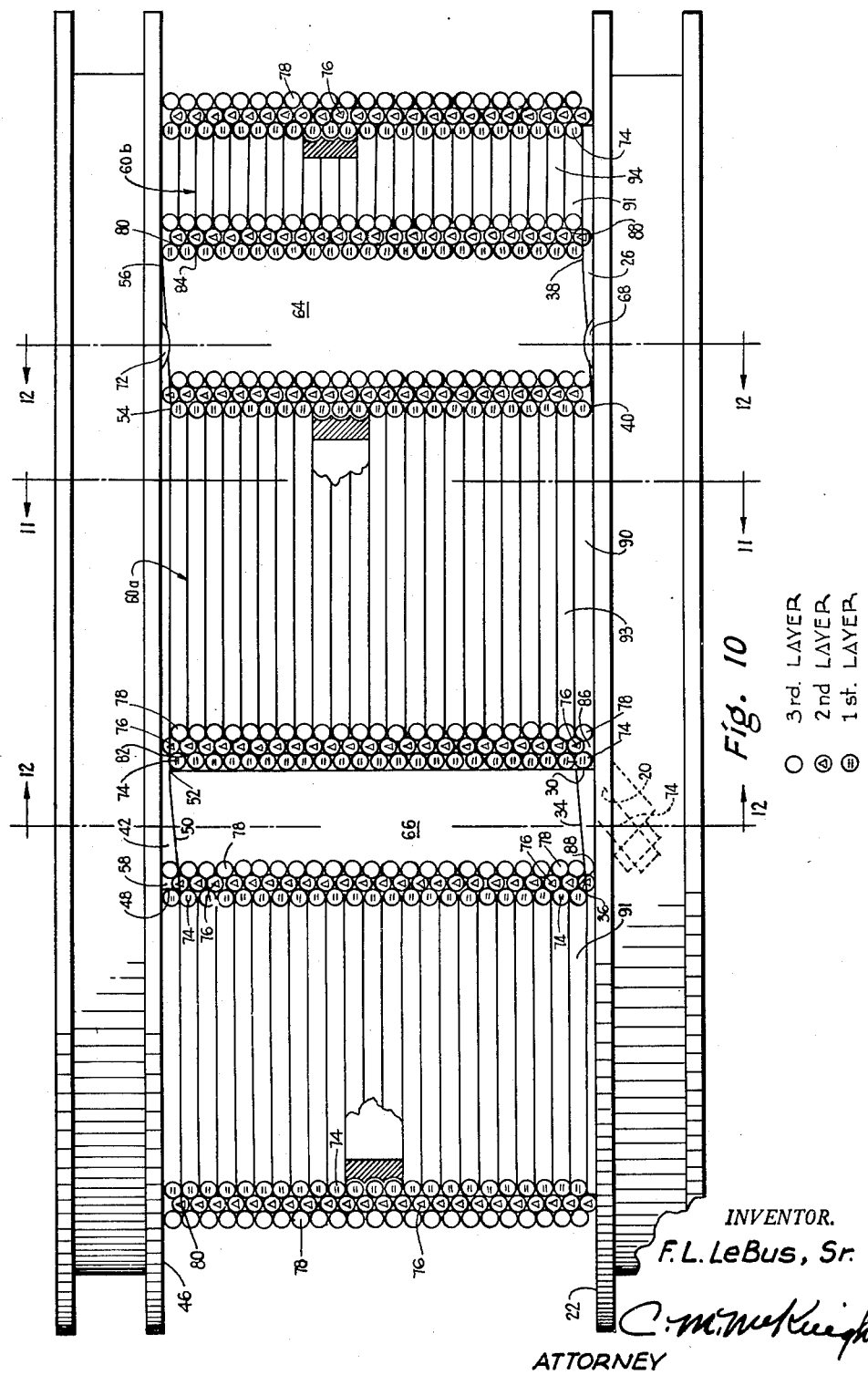
Figure 10 is an evolved plan view of the apparatus shown in Figs. 1 and 2 illustrating, schematically, the disposition of cable wound thereon.
Figure 11:
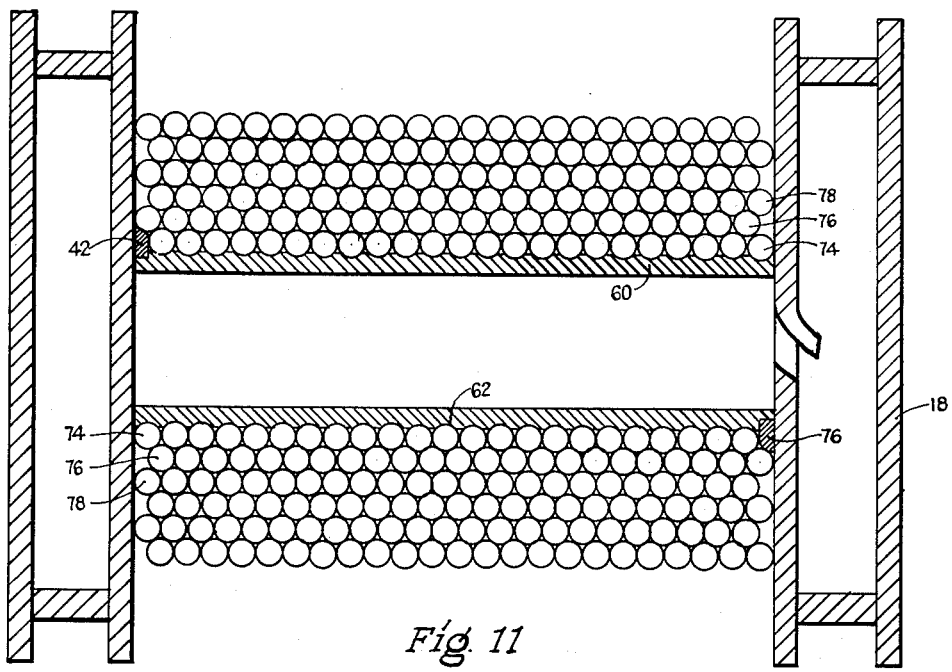
Figure 11 is a view taken on lines 11—11 of Fig. 10.
Figure 12:
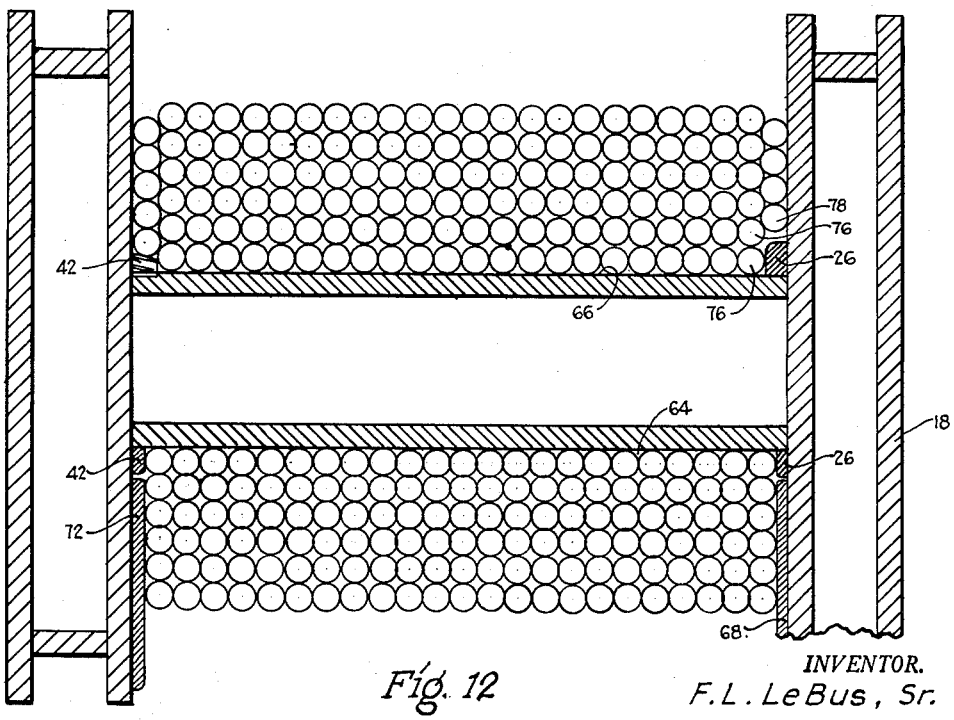
Figure 12 is a view taken on lines 12—12 of Fig. 10.

Referring to Figs. 10, 11 and 12, it will be noted that the layers of cable 74, 76 and 78 is shown in cross section at various points to illustrate the manner in which the cable is stacked as it is wound onto the drum 12. For purposes of illustration, the various layers of cable are provided with the following legend as set forth adjacent Fig. 10 of the drawings. The first layer 74 is depicted with a circle having parallel lines therein; the second layer depicts a circle having a triangle therein, and the third layer with the circle per se. The cable 74, as it emerges from the aperture 20 and underneath the end 30 of the control bar 26, enters a groove 62 of the bar 90 disposed in end to end relation with the bar 26. The cable upon rotation of the drum counter-clockwise is guided by the bar 90 in a direction parallel to the brake flange 18 until it contacts the smooth surface or first control zone 64, whereupon the wedge-shaped control bar 26 forces the first layer 74 of cable away from the brake flange 18. As the cable is applied to the first control zone 64, it is moved a distance equal to one-half the diameter of the cable. The cable wrap 74 enters the groove 62 of the first bar 91 disposed adjacent the inner face of the bar 26 and is guided thereby in a direction again parallel to the brake flange 18. When the cable layer 74 reaches the smooth portion or second control zone 66, it is contacted by the inner face 34 of the bar 26 and again forced away from the flange 18 a distance equal to one-half the diameter of the cable. Thus, the cable layer 74 is bent in two distinct steps a total distance equal to the diameter of the cable during the first wind of the cable on the drum 12. When the first layer of cable 74 is even with the large end 30 of the bar 26, the first wind is completed and the cable is in line with the bar 93 of the upper set 60ª located second from the brake flange 18.

The cable then enters the groove 62 of the last mentioned bar 93 and is guided in a path parallel to the brake flange 18. Upon reaching the smooth portion of the first control zone 64, the second wind of cable layer 74 contacts the first wind of cable, and is forced away from the brake flange 18 the same distance and direction as the first wind. The second wind of the cable then enters the groove 62 of the bar 94 in the lower set 60ᵇ located second from the bar 26 and is wound in a parallel path. As the second wind reaches the second control zone 66, it again contacts the first wind and is forced away from the flange 18 an equal distance. The second wind of cable layer 74 is then completed, and the cable is in line with the next empty bar 60 of the upper set.

The third and subsequent winds of the cable layer 74 are guided in the same manner as the second wind, thereby causing a progression of the cable layer 74 across the core 14 in two distinct bending movements during each wind. The cable 74 is thus wound in a combination helical and parallel path with the movement of the cable in each wind being controlled by the cable of the previous wind.

As the last wind of the first layer of cable 74 approaches the second control zone 66, the cable enters the groove 58 in the outer periphery of the riser control bar 42. The cable 74 is thus moved outwardly (or raised) from the core 14 to a position above the remainder of the first layer of cable 74, and upon reaching the point 52 of the bar 42 begins the first wind of the second layer of cable 76. It will be noted that at the ending of the first layer 74 and beginning of the second layer 76, the cable is in contact with the inner face 46 of the brake flange 16.

During the first portion of the first wind of the second layer 76, the cable rides on top of the control bar 42 in contact with the flange 16 in a parallel direction. As this first wind of the second layer 76 reaches the first control zone 64, the control strip 72 forces the cable away from the brake flange 16 in a reversed helix, or the cable is bent in a direction opposite to that of the helical bends of the first layer of cable, an amount equal to one-half the diameter of the cable. This effects a cross-over of one wrap of the first layer 74. The cable is thus forced over into the parallel groove 80, which is formed by the last two winds in the first layer 74 between zones 64 and 66. The cable follows the groove 80 until it contacts the raised portion of the last wind of the first layer 74 approximately at a position even with the large end 48 of the bar 42 adjacent the second control zone 66. This raised portion of the first layer 74 forces the cable in another reversed helix a distance equal to one-half the diameter of the cable, but making a complete reversing movement in the first wind of the second layer 76 of approximately the diameter of the cable.

Upon completion of the last described reversing movement, the first wind of the second layer 76 is completed and the cable enters the second parallel groove 82 formed by the last two winds of the first layer 74 between the second zone 66 and the first zone 64. The groove 82 guides the second wind of the cable 76 in a parallel direction until the first control zone 64 is reached. The second wind then is contacted by the first wind and forced in a reverse helical direction a distance equal to one-half the diameter of the cable. Thereupon the cable layer 76 enters the groove 84 provided between the next-to-last and third-from-last winds of the first layer 74 from the first control zone 64 to the second zone 66, and is again guided in a direction parallel to the brake flange 16. As the second wind of cable 76 reaches the second control zone 66, it is forced in another reverse helical direction away from the flange 16 to complete the second wind.

The third and subsequent winds of the second layer 76 are formed in the same manner as the second wind. Thus, the cable layer 76 is wound parallel in the same areas as was the cable 74, and the helical bent, or cross-over portions of each wind in the second layer 76 are directly above the helical bent portions of the first layer 74.

As the last wind of the second cable layer 76 progresses through the second control zone 66, it is forced upwardly by the adjacent helical portion of the next-to-last wind of that layer because the space or gap remaining between said portion and the inner face 22 of the flange 18 is shortened and will not accommodate the cable. Thus, at the completion of the last wind of the second cable layer 76, the cable is in contact with the face 22 of flange 18, and in a position above the remainder of the second layer.

The third layer 78 is then commenced by winding the cable in the groove 86 provided between the last wind of the second layer 76 and the flange 18. Upon reaching the first control zone 64, the cross-over strip 68 forces the cable 78 in a helical direction away from the brake flange 18 a distance equal to one-half the diameter of the cable. The first wind then follows the groove 88 provided between the last two winds of the second cable layer 76 in a direction parallel to the brake flange 18. As the first wind of the third cable layer 78 is applied in the second control zone 66, it contacts the raised portion of the last wind of the second cable layer 76, and is forced out of the groove 88. Thus, the first wind of the third cable layer 78 is forced or bent a total distance equal to the diameter of the cable in two separate binding movements.

The second and subsequent winds of the third cable layer 78 are wound in a similar path, and the helical movement thereof is controlled by the preceding wind in the same manner as in the second cable layer 76. An indefinite number of layers may be applied to the drum 12, and each wind would be bent or crossed over in the same two control zones.

From the foregoing, it will be apparent that the present invention provides a novel cable winding apparatus which will not vibrate at high speeds. All of the cross overs are obtained in two diametrically opposed zones, hence the resulting build-up of cable at these points will be balanced (Figs. 11 and 12). Also, the cable is bent in two different steps during each wind, thus reducing chafing and the inherent fatigue resulting from excessive bending, due to the cable bending only one-half of its diameter to effect a complete cross-over of one line. Thus, a one-half pitch movement effects as a whole or one complete pitch result. In addition, the cross overs are positively directed with the minimum reliance upon reaction of one layer with a previous layer. Furthermore, the invention provides for utilization of a raised wind at each end of the first layer of cable to direct a partial cross-over in one control zone of a subsequent layer of the cable. The completed cable cross-over is obtained in the other control zone through a control strip cooperating therewith.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A cable winding apparatus, comprising a circular drum core having flanges on the opposite ends thereof, a set of circumferential grooves on the outer periphery of the drum core adapted to receive a cable, said grooves extending parallel to the flanges of a length less than a semi-circular portion of the drum core, a similar set of grooves on the diametrically opposite semi-circular portion of the drum core, and of less length than said portion, the space between the two sets of grooves providing two smooth surface control areas on the drum core, and means adjacent one end of the drum core to force the first wind of cable on the drum core at an angle in said control areas.

2. In a balanced cable winding apparatus for high speed spooling, comprising a cylindrical drum core having flanges on the opposite ends thereof, a set of circumferential grooves on the outer periphery of the drum core to receive a cable being wound on the core, said grooves being arranged parallel to the flanges and of a length less than one-half the circumference of the drum core and substantially aligned longitudinally along the drum core, a second set of similar grooves on the opposite half side of the drum core, the space between the two sets of grooves providing a pair of diametrically opposed smooth surfaced control zones, said sets of grooves being offset longitudinally of the drum core, and an arcuate control bar around one end of the drum core having wedge shaped portions in alignment with said control zones to bend the first wind of cable on the drum core in said control zones.

3. In a balanced cable winding apparatus for high speed spooling of cable in winds and comprising a circular drum core for receiving a plurality of layers of cable, means for directing the cable winds in a parallel path through a greater portion of the core periphery, means for bending a portion of the winds of cable to obtain a partial cross-over action of the first wind of the subsequent layers of cable, means disposed at a diametrically opposite position on the drum core from the second mentioned means for subsequently completing the bending of the first bent cable portion whereby a distributed cross-over action is obtained.

4. In a balanced cable winding apparatus for high speed spooling of cable in winds and comprising a circular drum core for receiving a plurality of layers of cable, means for directing the cable winds in a parallel path around a greater portion of the circumference of the core, means for bending a portion of the winds of cable in a partial helical path to obtain a cross-over action for the first wind of subsequent layers of cable above the first layer, means for subsequently completing the bend of the cable to a full helical path to provide a distributed cross-over action, and means disposed on the drum in diametrically opposed positions cooperating with the bending means for maintaining a balance of the drum during rotation thereof.

5. A balanced cable winding apparatus, comprising a cylindrical drum core having flanges on the opposite ends thereof, a set of circumferential grooves in the outer periphery of the drum core to receive a cable being wound on the core, said grooves being arranged parallel to the flanges and of a length less than one-half the circumference of the drum core and substantially aligned longitudinally along the drum core, a set of similar grooves in the opposite half side of the drum core, said two sets of grooves providing first and second diametrically opposed smooth surfaced control zones therebetween, said sets of grooves being offset relative to each other longitudinally of the drum core, an arcuately shaped control bar around one end of the drum core having wedge-shaped portions in alignment with said control zones to bend the first wind of cable on the drum core in said control zones, a second arcuately-shaped control bar around the opposite end of the drum core to raise the last wind of cable in the first layer within the first control zone for starting the second layer of cable, and a cross-over control strip on one of the flanges above said second control bar in alignment with the second control zone.

References Cited in the file of this patent

UNITED STATES PATENTS

| | | |
|---|---|---|
| 2,204,938 | Le Bus | June 18, 1940 |
| 2,420,050 | Maude | May 6, 1947 |
| 2,599,926 | Le Bus | June 10, 1952 |
| 2,620,996 | Le Bus | Dec. 9, 1952 |
| 2,633,629 | Crookston | Apr. 7, 1953 |